3,000,972
PRODUCTION OF TRINITROTOLUENE
Giovanni A. Bonetti, Wilmington, Del., assignor to The Atlantic Refining Company, Philadelphia, Pa., a corporation of Pennsylvania
No Drawing. Filed Feb. 6, 1958, Ser. No. 713,550
8 Claims. (Cl. 260—645)

This invention relates to the production of trinitrotoluene and more particularly it relates to the production of trinitrotoluene by the single step nitration of toluene or mononitrotoluene.

The production of trinitrotoluene prior to about 1945 was carried out in three steps. However, at about that time modifications in production methods were introduced such that it was possible to carry out the reaction in two steps. In all cases, however, the third nitro group was introduced into the benzene ring in the final step, and to accomplish this the nitration was carried out at high temperatures of the order of 180° C. to 230° C. with about a 30 minute "cooking" period. The mixture utilized for such processes was the usual nitration mixture of concentrated nitric acid and concentrated sulfuric acid. The only other major change in the process made in recent years was the introduction of the "oil" into the acid for the purpose of eliminating dangerous foaming.

A method has now been found whereby it is possible to nitrate a mononuclear aromatic compound selected from the group consisting of toluene and mononitrotoluene in a single step to produce trinitrotoluene. According to this method it is possible to introduce three nitro groups simultaneously into the aromatic ring of toluene or two nitro groups into the aromatic ring of mononitrotoluene with an extremely short reaction time and at temperatures considerably below the temperatures heretofore thought necessary to be employed in the production of trinitrotoluene.

It is therefore an object of this invention to provide a method for the production of trinitrotoluene from toluene or mononitrotoluene in a single step.

It is a further object of this invention to provide a method for the production of trinitrotoluene by the simultaneous introduction of three nitro groups into the aromatic ring of toluene, or the simultaneous introduction of two nitro groups into the aromatic ring of mononitrotoluene.

It is a further object of this invention to provide a method for the production of trinitrotoluene by the nitration of toluene or mononitrotoluene in a single step at moderate temperatures and with exceedingly short reaction times.

In accordance with the instant invention, toluene or mononitrotoluene is employed as the starting material. Since 2,4,6-trinitrotoluene is the preferred isomer from the standpoint of importance as an explosive, it is desirable that if the mononitrotoluene is a mixture of the ortho-, meta-, and para- isomers that the ortho- and para- isomers be present predominantly, with as little of the meta- isomer present as possible since the meta- isomer obviously cannot be nitrated to the desired 2,4,6-trinitrotoluene. It is preferable that the meta- isomer be present to the extent of no more than 10 percent and even more preferably below about 5 percent of the total mixture of the isomers. It will be apparent, however, that this process is applicable for the preparation of all of the isomers of trinitrotoluene and in the preparation of certain isomers the meta- mononitrotoluene may be employed with advantage.

It now has been found that toluene may be trinitrated in a single step, substantially instantaneously, at temperatures preferably ranging between 130° C. to 140° C. by the use of a mixture of fuming nitric acid and fuming sulfuric acid to produce predominantly 2,4,6-trinitrotoluene. It has been found also that the ortho- and para- mononitrotoluene isomers may be dinitrated in a single step, substantially instantaneously, at temperatures ranging between 0° C. and 140° C. and more particularly between 80° C. and 120 C. by the use of a mixture of fuming nitric acid and fuming sulfuric acid to produce predominantly 2,4,6-trinitrotoluene.

The yield from such processes is exceedingly high and has been found to be equal to or considerably higher than the yields obtained by presently employed commercial processes. The crude trinitrotoluene is purified to give the desired isomer by conventional methods, i.e. water and soda ash wash followed by a dilute aqueous sodium sulfite solution wash, which in turn is followed by filtering, rewashing and drying.

The term fuming nitric acid as used in this specification and appended claims refers to nitric acid of specific gravity of at least 1.49. The term also includes the so-called 100 percent nitric acid and "red fuming" nitric acid.

The term fuming sulfuric acid as used in this specification and appended claims refers to sulfuric acid containing free $SO_3$ particularly acid containing about 0.25 mol of free $SO_3$ per 100 grams of solution, known commercially as 20 percent oleum. Fuming acids having $SO_3$ concentrations above and below commercial 20 percent oleum also may be used preferably, however, those having a specific gravity above 1.85.

The nitration reaction should be conducted under substantially anhydrous conditions for the successful application of the process of this invention. These conditions are obtained by the use of the fuming sulfuric acid, since the $SO_3$ in the acid reacts with a portion of the water formed in the nitration reaction to produce additional sulfuric acid, and the sulfuric acid forms "hydration" complex compounds with water, $H_2SO_4 \cdot xH_2O$, thus removing all the water from the reaction.

In accordance with this invention, three nitro groups are introduced simultaneously into the nucleus of toluene by adding toluene to a nitrating mixture at a rate of one mol of toluene to a mixture composed of 3.15 to 9.0 mols of fuming nitric acid (calculated as $HNO_3$) and 0.75 to 9.0 mols of free $SO_3$ as contained in fuming sulfuric acid preferably a commercial oleum such as the 20 to 23 percent oleum. It has been found necessary to employ at least 0.75 mols of free $SO_3$ (contained in the fuming sulfuric acid) per mol of the toluene in order to provide the completely anhydrous reaction mixture. Amounts in excess of 9.0 mols of free $SO_3$ do not provide any technical benefit, but, in fact, may decrease the yield of trinitrotoluene by side reactions. Moreover, excessive amounts add to the expense of materials and increase the handling problems.

Further, in accordance with this invention two nitro groups may be introduced simultaneously into the nucleus of nitrotoluene by adding mononitrotoluene to a nitrating mixture at the rate of one mol of mononitrotoluene to a mixture composed of 2.1 to 6.0 mols of fuming nitric acid (calculated as $HNO_3$) and 0.5 to 6.0 mols of free $SO_3$ as contained in fuming sulfuric acid which is preferably a commercial oleum such as a 20 to 23 percent oleum. It has been found necessary to employ at least 0.5 mols of free $SO_3$ contained in the fuming sulfuric acid per mol of the mononitrotoluene in order to provide the completely anhydrous reaction mixture. It is preferable to employ less than about six mols of free $SO_3$ per mol of mononitrotoluene for the same reasons as above outlined.

By theory, in the production of each mol of trinitrotoluene from toluene at least three mols of nitric acid will be consumed and in the production of each mol of There were 60 grams of product (approximately a 93 percent yield) having a melting point of 78° C.

The above examples demonstrate that with the process of the instant invention it is possible to produce trinitrotoluene quickly at moderate temperatures as compared with the long, dangerous, high temperature nitration processes practiced heretofore in the production of this compound.

I claim:

1. A method for the production of trinitrotoluene which comprises contacting under anhydrous conditions a mononuclear aromatic compound from the group consisting of toluene and mononitrotoluene with a nitration mixture composed of fuming nitric acid and fuming sulfuric acid at a temperature between 80° C. and 140° C., the amount of fuming nitric acid ranging between 1.05 and 3.0 mols of acid for each gram-atom of hydrogen to be replaced in the nucleus of the mononuclear aromatic compound and the amount of free $SO_3$ contained in the fuming sulfuric acid ranging between 0.25 and 3.0 mols of free $SO_3$ for each gram-atom of hydrogen to be replaced in the nucleus of the mononuclear aromatic compound and recovering the trinitrotoluene from the reaction mixture.

2. A method for the production of trinitrotoluene which comprises contacting under anhydrous conditions a mononuclear aromatic compound from the group consisting of toluene and mononitrotoluene with a nitration mixture composed of fuming nitric acid and fuming sulfuric acid at a temperature between 80° C. and 140° C., the amount of fuming nitric acid ranging between 1.1 and 1.25 mols of acid for each gram-atom of hydrogen to be replaced in the nucleus of the mononuclear aromatic compound and the amount of free $SO_3$ contained in the fuming sulfuric acid ranging between 0.3 and 0.75 mols of free $SO_3$ for each gram-atom of hydrogen to be replaced in the nucleus of the mononuclear aromatic compound and recovering the trinitrotoluene from the reaction mixture.

3. A method for the production of trinitrotoluene which comprises contacting under anhydrous conditions toluene with a nitration mixture composed of fuming nitric acid and fuming sulfuric acid at a temperature ranging between 130° C. and 140° C., the amount of fuming nitric acid ranging between 3.15 and 9.0 mols of acid for each mol of toluene and the amount of free $SO_3$ contained in the fuming sulfuric acid ranging between 0.75 and 9.0 mols of free $SO_3$ for each mol of toluene and recovering the trinitrotoluene from the reaction mixture.

4. A method for the production of trinitrotoluene which comprises contacting under anhydrous conditions mononitrotoluene with a nitration mixture composed of fuming nitric acid and fuming sulfuric acid at a temperature ranging between 80° C. and 120° C., the amount of fuming nitric acid ranging between 2.1 and 6.0 mols of acid for each mol of mononitrotoluene and the amount of free $SO_3$ contained in the fuming sulfuric acid ranging between 0.5 and 6.0 mols of free $SO_3$ for each mol of mononitrotoluene and recovering the trinitrotoluene from the reaction mixture.

5. A method for the production of trinitrotoluene which comprises contacting under anhydrous conditions mononitrotoluene with a nitration mixture composed of fuming nitric acid and fuming sulfuric acid at a temperature ranging between 80° C. and 100° C., the amount of fuming nitric acid ranging between 2.1 and 6.0 mols of acid for each mol of mononitrotoluene and the amount of free $SO_3$ contained in the fuming sulfuric acid ranging between 0.5 and 6.0 mols of free $SO_3$ for each mol of mononitrotoluene and recovering the trinitrotoluene from the reaction mixture.

6. A method for the production of 2,4,6-trinitrotoluene which comprises contacting under anhydrous conditions toluene with a nitration mixture composed of fuming nitric acid and fuming sulfuric acid at a temperature ranging between 130° C. and 140° C., the amount of fuming nitric acid ranging between 3.3 and 3.75 mols of acid for each mol of toluene and the amount of free $SO_3$ contained in the fuming sulfuric acid ranging between 0.9 and 2.25 mols of free $SO_3$ for each mol of toluene and recovering the 2,4,6-trinitrotoluene from the reaction mixture.

7. A method for the production of 2,4,6-trinitrotoluene which comprises contacting under anhydrous conditions a mixture of mononitrotoluene isomers in which the ortho- and para- isomers predominate with a nitration mixture composed of fuming nitric acid and fuming sulfuric acid at temperatures ranging between 80° C. and 120° C., the amount of fuming nitric acid ranging between 2.2 and 2.5 mols of acid for each mol of mononitrotoluene and the amount of free $SO_3$ contained in the fuming sulfuric acid ranging between 0.6 and 1.5 mols of free $SO_3$ for each mol of mononitrotoluene and recovering the 2,4,6-trinitrotoluene from the reaction mixture.

8. A method for the production of 2,4,6-trinitrotoluene which comprises contacting under anhydrous conditions a mononitrotoluene from the group consisting of ortho- nitrotoluene and para- nitrotoluene with a nitration mixture composed of fuming nitric acid and fuming sulfuric acid at temperatures ranging between 80° C. and 120° C., the amount of fuming nitric acid ranging between 2.2 and 2.5 mols of acid for each mol of mononitrotoluene and the amount of free $SO_3$ contained in the fuming sulfuric acid ranging between 0.6 and 1.5 mols of free $SO_3$ for each mol of mononitrotoluene and recovering the 2,4,6-trinitrotoluene from the reaction mixture.

References Cited in the file of this patent

FOREIGN PATENTS 490,951    Canada _____ Mar. 3, 1953

OTHER REFERENCES

Fieser et al.: "Org. Chemistry," 613–15 (1950), second ed., D. C. Heath & Company, Boston.

UNITED STATES PATENT OFFICE
CERTIFICATE OF CORRECTION

Patent No. 3,000,972 September 19, 1961

Giovanni A. Bonetti

It is hereby certified that error appears in the above numbered patent requiring correction and that the said Letters Patent should read as corrected below.

Column 2, line 6, for "0° C." read -- 80° C. --; column 3, line 73, for "80 C." read -- 80° C. --.

Signed and sealed this 30th day of January 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,000,972                                             September 19, 1961

Giovanni A. Bonetti

It is hereby certified that error appears in the above numbered patent requiring correction and that the said Letters Patent should read as corrected below.

Column 2, line 6, for "0° C." read -- 80° C. --; column 3, line 73, for "80 C." read -- 80° C. --.

Signed and sealed this 30th day of January 1962.

(SEAL)
Attest:

ERNEST W. SWIDER
Attesting Officer

DAVID L. LADD
Commissioner of Patents